US00RE36188E

United States Patent [19]

Gosens et al.

[11] E Patent Number: Re. 36,188

[45] Reissued Date of Patent: Apr. 6, 1999

[54] POLYMER MIXTURE HAVING AROMATIC POLYCARBONATE STYRENE I CONTAINING COPOLYMER AND/OR GRAFT POLYMER AND A FLAME-RETARDANT, ARTICLES FORMED THEREFROM

[75] Inventors: Johannes C. Gosens, Roosendaal, Netherlands; Charles F. Pratt, Brasschaat, Belgium; Herman B. Savenije, LW Bergen op Zoom; Christianus A. A. Claesen, CA Bergen op Zoom, both of Netherlands

[73] Assignee: General Electric Company, Pittsfield, Mass.

[21] Appl. No.: 923,035

[22] Filed: Sep. 3, 1997

Related U.S. Patent Documents

Reissue of:

[64] Patent No.: 5,204,394
Issued: Apr. 20, 1993
Appl. No.: 887,580
Filed: May 20, 1992

U.S. Applications:

[63] Continuation of Ser. No. 750,703, Aug. 20, 1991, abandoned, which is a continuation of Ser. No. 411,751, Sep. 20, 1989, abandoned.

[51] Int. Cl.[6] ..... C08K 5/523; C08K 5/5357

[52] U.S. Cl. ..... 524/125; 524/127

[58] Field of Search ..... 524/125, 127

[56] References Cited

U.S. PATENT DOCUMENTS

| | | | |
|---|---|---|---|
| 3,987,008 | 10/1976 | Stackman | 524/45 |
| 4,078,016 | 3/1978 | Karmer | 524/860 |
| 4,214,062 | 7/1980 | Binsack et al. | 524/165 |
| 4,223,100 | 9/1980 | Reinert | 524/404 |
| 4,332,921 | 6/1982 | Schmidt | 524/462 |
| 4,463,130 | 7/1984 | Serini et al. | 524/394 |
| 4,481,338 | 11/1984 | Serini et al. | 524/67 |
| 4,766,165 | 8/1988 | Kress | 524/140 |
| 4,966,814 | 10/1990 | Ohzeki | 428/457 |

FOREIGN PATENT DOCUMENTS

| | | | |
|---|---|---|---|
| 1261500 | 7/1989 | Canada . | |
| 5053 | 10/1979 | European Pat. Off. . | |
| 34697 | 9/1981 | European Pat. Off. . | |
| 103230 | 3/1984 | European Pat. Off. . | |
| 103231 | 3/1984 | European Pat. Off. . | |
| 1744493 | 3/1986 | European Pat. Off. . | |
| 206058 | 12/1986 | European Pat. Off. . | |
| 59-24736 | 2/1984 | Japan . | |
| 59-45351 | 3/1984 | Japan . | |
| 59-2022210 | 11/1984 | Japan . | |
| 59-202240 | 11/1984 | Japan . | |
| 63-117057 | 5/1988 | Japan | C08L 35/06 |
| 63-227632 | 9/1988 | Japan | C08G 79/04 |
| 2 043 083 | 10/1980 | United Kingdom | C08L 71/04 |

OTHER PUBLICATIONS

Robert W. Stackman–Ind. Eng. Chem. Prod. Res. Dev. (1982), 21, 332–336.

Patent Abstract vol. 9, No. 71 of Japanese 59–202240 published Nov. 1984.

*Primary Examiner*—Veronica P. Hoke

[57] ABSTRACT

The invention relates to a polymer mixture which comprises an aromatic polycarbonate, a styrene-containing copolymer and/or a styrene-containing graft polymer and a flame-retardant. It has been found that the use of a certain type of flame-retardants, namely oligomeric phosphates leads to a polymer mixture having improved properties. In particular to a polymer mixture having a good combination of flame retardancy, non-juicing characteristics of the flame retardant, good plastifying effect and good heat resistance.

22 Claims, No Drawings

POLYMER MIXTURE HAVING AROMATIC POLYCARBONATE STYRENE I CONTAINING COPOLYMER AND/OR GRAFT POLYMER AND A FLAME-RETARDANT, ARTICLES FORMED THEREFROM

Matter enclosed in heavy brackets [ ] appears in the original patent but forms no part of this reissue specification; matter printed in italics indicates the additions made by reissue.

This is a continuation of copending application Ser. No. 07/750,703, filed Aug. 20, [1976] *1991* now abandoned, which is a continuation of Ser. No. 07/411,751, filed on Sep. 20, 1989 now abandoned.

The invention relates to a polymer mixture which comprises an aromatic polycarbonate (A), a styrene-containing copolymer and/or a styrene-containing graft polymer (B), and a phosphate based flame-retardant (C).

Polymer mixtures which comprise an aromatic polycarbonate, a styrene-containing graft polymer, for example, ABS, and a flame-retardant are known, for example, from EP-A-0174493. According to this prior art a monophosphate ester, for example, triphenyl phosphate, tricresyl phosphate, diphenylcresyl phosphate, and the like, is used as a flame-retardant. The known polymer mixture moreover must comprise a halogen compound and a tetrafluoroethylene polymer which is applied in a very special manner. Monophosphate esters tend to migrate to the surface when the mixture is injection [moulded] *molded* causing the so-called juicing. In order to obtain a V-0 rating according to UL-94 one has either to use the monophosphates in combination with other flame retardants or in relatively high concentrations causing a decrease of the heat resistance of the mixture.

EP-A-0206058 describes polymer mixtures which comprise an aromatic polycarbonate, a styrene maleic anhydride copolymer, an alkyl- or arylphosph(on)ate and a mixture of a tetrafluoroethylene polymer and a styrene-containing graft polymer. This known polymer mixture may moreover comprise a halogen compound. Here again there are only described monophosphates causing the above mentioned disadvantages.

DE-A-2921325 describes polymer mixtures which comprise an aromatic polycarbonate and a diphosphate compound derived from pentaerythritol. These known polymer mixtures may moreover comprise an ABS and a halogen compound. The use of the described [diphospates] *diphosphates* causes some problems since they tend to delamination at higher concentrations in view of their poor solubility. [Above] *Also* they have too little plasticizing effect. Their flame retardant properties are such that at least 20% by weight is needed in [non-halogene] *non-halogen* comprising PC-ABS blends in order to obtain a V-0 rating at 1.6 mm.

EP-A-103230 describes polymer mixtures comprising a specific type of polycarbonate, a styrene copolymer and/or graft polymer and a polyphosphate flame retardant. The polyphosphate should have a molecular weight of 1600–150.000. It seems to be impossible to reach a V-0 rating for these known mixtures unless one incorporates a [halogene] *halogen* based flame retardant. According to the above cited EP-A-174493 (see page 6) it is essential to use in these known compositions a specific type of polycarbonate in order to obtain sufficient flame retardancy.

The invention is based on the discovery that the incorporation of specific oligomeric phosphates as will be described here below results in a polymer mixture having at moderate levels of [phospate] *phosphate*, in the absence of other flame retardants, a V-0 rating at 1.6 mm, not showing a tendency to juicing and being plastified to the desired degree. [Above] *Also* the polymer mixture of the invention has a good weld line strength and a good retention of heat resistance.

The polymer mixture according to the invention comprises as a flame retardant an oligomeric phosphate or a blend of oligomeric phosphates with the formula 1

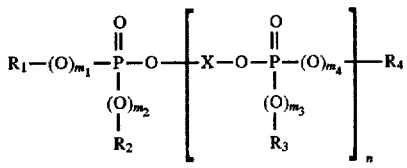

(I)

wherein $R_1$, $R_2$, $R_3$, and $R_4$, each represent an aryl or an [alkarylgroup] *alkaryl group* chosen independently of each other and wherein X is an arylene group, $m_1$, $m_2$, $m_3$, and $m_4$, each independently of each other are 0 or 1 and wherein n=[1,2,3,4] *1 2, 3, 4* or 5 or wherein, in case of a blend of phosphates, n has an average value between 1 and 5.

The above described flame retardants and a suitable process for their manufacture have been described in JP-A-202240/1984. According to this prior art said flame retardants may be used in admixture with thermoplastic resins. As a possible resin mention is made of polycarbonate. It could however not be foreseen that the above described flame retardants would offer the above described advantages in polymer mixtures comprising an aromatic polycarbonate and a styrene copolymer and/or styrene graft copolymer.

The flame-retardant may be used in a quantity of 1–25, more preferably in a quantity of 5–20 parts by weight per hundred parts by weight of aromatic polycarbonate (A) plus styrene copolymer and/or styrene graft polymer [(C)] *(B)*. In order to obtain optimal flame-retarding properties it is necessary to use comparatively large quantities of the flame-retardant. Such quantities are however lower than those required for the phosphates used in the above described prior art. As a result of this, other properties of the polymer mixture may be influenced. It is therefore to be preferred to use the flame-retardant, i.e. the above-mentioned oligomeric phosphate in combination with one or more other agents which may ensure improvement of the flame-retarding properties. For that purpose it is possible, for example, to use one or more of the following constituents (D):

- a salt having flame-retarding properties for aromatic polycarbonates and/or
- a halogen-containing low-molecular weight compound and/or high-molecular weight polymer and/or
- a perfluoroalkane polymer and/or
- a metal compound acting as a synergist.

The polymer mixture according to the invention preferably comprises as a graft polymer the product obtained by grafting a mixture of (1) styrene and/or alphamethyl styrene and/or a styrene substituted with one or more halogen atoms or with organic groups in the aromatic nucleus and (2) a methacrylonitrile and/or acrylonitrile and/or maleic anhydride and/or a derivative of maleic anhydride and/or acrylic monomer on a rubber (3).

The polymer mixture according to the invention may comprise as a styrene-containing copolymer a copolymer built up from (1) styrene, and/or alpha-methyl styrene and/or a styrene substituted with one or more halogen atoms or with organic groups in the aromatic nucleus and (2) a methacrylonitrile and/or acrylonitrile and/or maleic anhydride and/or derivative of maleic anhydride and/or acrylic monomer.

The polymer mixture according to the invention may comprise a mixture of a styrene copolymer and a styrene graft polymer as described hereinbefore.

The invention also relates to articles formed from the polymer mixture according to the invention.

The polymer mixture according to the invention preferably comprises 5–95% by weight, more preferably [10] 10–90% by weight of constituent A and 95–5% by weight, more preferably 90–10% by weight of constituent B.

The polymer mixture according to the invention comprises at any rate the following constituents:

A. an aromatic polycarbonate and

B. a styrene-containing copolymer and/or a styrene-containing graft polymer, and C. on oligomeric phosphate as a flame retardant.

The polymer mixture according to the invention may comprise moreover one or more of the following constituents:

D. further flame-retardants

E. conventional additives.

A. Aromatic Polycarbonates

Aromatic polycarbonates are materials known per se. They are generally prepared by reacting a dihydric phenol compound with a carbonate precursor, for example, phosgene, a halogen formiate or a carbonate ester. Aromatic polycarbonates are polymers which comprise units of the formula

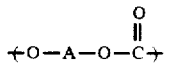

wherein A is a bivalent aromatic radical which is derived from the dihydric phenol used in the preparation of the polymer. Dihydric phenols which may be used in the preparation of the aromatic polycarbonates are mononuclear or polynuclear aromatic compounds which comprise two hydroxy radicals each directly bonded to a carbon atom of an aromatic nucleus. Said dihydric phenols may be substituted with one or more [halogene] *halogen* atoms or one or more [alkylgroups] *alkyl groups*.

Branched polycarbonates known per se, as described, for example in U.S. [patent application Ser.] *Pat.* No. 4,001,184, are also suitable.

Suitable aromatic polycarbonates are also the so-called polyester carbonates which are obtained by performing the [polymerisation] *polymerization* reaction in the presence of an ester precursor, for example, a difunctional carboxylic acid, for example, terephthalic acid or an ester-forming derivative thereof. These polyester carbonates have ester bonds and carbonate bonds in the polymeric chain. Polyester carbonates are described, for example, in U.S. [patent application Ser.] *Pat.* No. 3,169,121.

It is also possible to use a mixture of various polycarbonates.

B. Styrene-containing Copolymers and/or a Styrene-containing Graft Polymer

Suitable styrene-containing copolymers and suitable styrene-containing graft polymers are described, for example, in EP-A-0174493.

Styrene-containing copolymers are copolymers built up from units derived from (1) styrene, and/or alpha-methyl styrene and/or styrene compounds substituted with one or more [halogene] *halogen* atoms or with organic groups in the aromatic nucleus and/or methylmethacrylate and from (2) acrylonitrile and/or methacrylonitrile and/or maleic anhydride and/or a derivative of maleic acid anhydride and/or acrylic monomer. Suitable derivatives of maleic anhydride are maleimide and N-substituted [maleimids] *maleimides*, such as N-phenyl maleimide. Suitable acrylic monomers are, for example, methyl methacrylate, (meth) acrylic acid. These copolymers are known per se and they can be obtained according to conventional methods of preparing copolymers.

Styrene-containing graft polymers are obtained by grafting a mixture of at least two monomers on a rubber. Examples of suitable rubbers are polybutadiene, butadiene-styrene copolymers. Other rubbers, for example, acrylate rubbers and EPDM rubbers are also to be considered. A mixture of monomers is then grafted on these rubbers. Suitable monomers are indicated here above in conjunction with the description of the styrene copolymer.

C. Oligomeric Phosphates

The polymer mixture of the invention comprises an oligomeric phosphate with a formula 1, as shown in claim 1. In said formula $R_1$, $R_2$, $R_3$, and $R_4$, each represent an aryl or an [alkarylgroup] *alkaryl group* chosen independently of each other and X is an arylene group, $m_1$, $m_2$, $m_3$, and $m_4$, each independently of each other are 0 or 1 and n=1,2,3,4 or 5 or, in case of a blend of phosphates, N has an average value between 1 and 5.

Phosphates properly speaking are those compounds for which $m_1$, $m_2$, $m_3$ and $m_4$, are all equal to one. The term "phosphates" is however used throughout this description and in the claims to include compounds for which one or more of $m_1$, $m_2$, $m_3$ and $m_4$ are equal to zero.

The oligomeric phosphates as used in the polymer mixture according to the invention can be either used as [seperate] *separate* compounds or in the form of a blend of several different oligomers. The value of n in formula 1 is by preference greater than 0 but smaller than 3, more by preference equal to or greater than 1, but equal to or smaller than 2.

In the case of a blend of several different oligomers the above mentioned values for n indicate the average value in the oligomer blend.

The aryl groups $R_1$, $R_2$, $R_3$ and $R_4$ may be substituted with halogen atoms or alkyl groups. The aryl group preferably is a cresyl group and/or phenyl group and/or xylenyl group and/or is a propylphenyl group and/or butylphenyl group and/or a brominated or chlorinated [derivate] *derivative* thereof. The arylene group is a group derived from a dihydric compound, for example, resorcinol, hydroquinone, bisphenol A and chlorides and bromides thereof. These compounds are known per se.

A mixture of these oligomeric phosphates can be readily used, each having a different value of n.

The preferably used oligomeric phosphate is an oligomeric phosphate of formula 1, or a blend of such phosphates, wherein $m_1$, $m_2$, $m_3$ and $m_4$ are all equal to 1, $R_1$, $R_2$, $R_3$ and $R_4$ all represent a phenyl group. X represents a phenylene group and n has an (average) value of 1.2 to 1.7.

D. Further Flame-retardants

In addition to the above phosphates or phosphonates the polymer mixture according to the invention may comprise further agents to improve the flame-retarding properties. In particular may be mentioned:

a salt having flame-retarding properties for aromatic polycarbonates a halogen-containing low-molecular weight compound and/or high-molecular weight polymer and/or
a perfluoroalkane polymer and/or
a metal compound active as a synergist.

Salts having flame-retarding properties are generally known and are used on a large scale in polymer mixtures which comprise a polycarbonate. All salts which are suitable for polymer mixtures having a polycarbonate may be used in the polymer mixture according to the invention. In particular may be mentioned organic and inorganic [sulphonates] *sulfonates*, for example, sodium trichlorobenzene [sulphonate] *sulfonate*, salts of [sulphone sulphonates] *sulfone sulfonates*, for example, the potassium salt of [diphenylsulphone sulphonate] *diphenylsulfone sulfonate*, salts of perfluorinated alkane [sulphonic] *sulfonic* acid and sodium [aluminium] *aluminum* hexafluoride.

Examples of suitable halogen-containing compounds are decabromodiphenyl ether, octabromodiphenyl, octabromodiphenyl ether and further oligomeric or polymeric bromine compounds, for example, derived from tetrabromobisphenol A or also polyphenylene ethers brominated in the nucleus.

The salts mentioned hereinbefore are to be preferred. The addition of particularly small quantities from 0.01–0.5 parts by weight already provides a strongly noticeable effect.

Tetrafluoroethylene polymers are preferably used as perfluoroalkane polymers. The polymer mixture according to the invention may further comprise a metal or metal compound active as a synergist, for example, antimony oxide and the like. These synergists are usually used in combination with halogen-containing compounds.

E. Conventional Additives

In addition to the constituents mentioned hereinbefore the polymer mixture according to the invention may comprise one or more conventional additives, for example, fillers, reinforcing [fibres] *fibers*, [stabilisers] *stabilizers*, pigments and dyes, [plasticisers] *plasticizers*, [mould] *mold* release agents and antistatically active agents.

The polymer mixture can be obtained according to the conventional techniques of preparing polymer mixtures, for example, by compounding the said constituents in an extruder.

The polymer mixture according to the invention preferably comprises the said constituents in the following relative quantities:

Per 100 parts by weight of constituents A+B the polymer mixture according to the invention may comprise
D. 0–20 parts by weight of one or more further agents to improve the flame-retarding properties and or
E. 0–100 parts by weight of conventional additives.

The following constituents were used in the examples hereinafter:

| | |
|---|---|
| PC-1 | an aromatic polycarbonate derived from bisphenol A and phosgene having an intrinsic viscosity of 49 ml/g measured in methylene chloride at 25° C. |
| PC-2 | an aromatic polycarbonate having an intrinsic viscosity of 55 ml/g. |
| ABS-1 | a graft copolymer, built up substantially from a butadiene rubber on which styrene and acrylonitrile have been grafted, with a rubber-content of approximately 30%. |
| ABS-2 | a graft copolymer built up substantially from a butadiene rubber on which styrene and acrylonitrile have been grafted with a rubber content of approximately 70%. |
| ABS-3 | a similar product as ABS-1 and ABS-2 with a rubber content of approximately 50%. |
| Phosphate-1 | a mixture of several oligomeric phosphates with formula 1, wherein $R_1$, $R_2$, $R_3$ and $R_4$ represent a phenyl-group, m1, m2, m3 and m4 are all 1, X is a phenylene group and n has an average value of about 1.4. |
| Phosphate-2 | a mixture of several oligomeric phosphates with the same structure as phosphate-1, but with an average value of n of approximateiy 2.8. |
| TPP-1 | triphenyl phosphate |
| TPP-2 | a 40/60 blend of triphenylphosphate and trisisopropylphenylphosphate. |
| BR-PC | a polymeric polycarbonate having units derived from tetrabromobisphenol A and from bisphenol A, with a bromine content of about 25%. |
| Teflon ® | a tetrafluoropolyethylene |
| STB | the sodium salt of trichlorobenzene [sulphonate] *sulfonate*. |
| SAN | a styrene-acrylonitrile copolymer with a molecular weight of about 100,000 and a styrene to acrylonitrile ratio of about 72 to 28. |

*DETAILED DESCRIPTION OF THE INVENTION*

EXAMPLES A, B AND I–III

Four different polymer mixtures were prepared from the above-mentioned constituents in the quantities as indicated in the following table. For that purpose the indicated constituents were compounded in an extruder. The resulting extrudate was then [pelletised] *pelletized*. [Standardised] *Standardized* test rods were [injection-moulded] *injection molded* from the pellets to determine the properties. The properties found are also recorded in the following table A:

TABLE A

| Example No. | A | B | I | II | III |
|---|---|---|---|---|---|
| Composition (parts by weight) | | | | | |
| PC-1 | 75 | 64.5 | 64.5 | 64.5 | 58.5 |
| ABS-1 | 25 | 25 | 25 | 25 | 25 |
| Phosphate-1 | — | — | 10 | 10 | 10 |
| TPP-1 | — | 10 | — | — | — |
| Teflon | — | 0.5 | 0.5 | 0.5 | 0.5 |
| STB | — | 0.02 | — | 0.02 | — |
| Br.PC | — | — | — | — | 6 |
| Properties | | | | | |
| UL-rating[1] (1.6 mm) | HB | V-1 | V-2 | V-0 | V-0 |
| Vicat[2] (°C.) | 133 | 89 | 95 | 95 | 96 |
| Juicing[3] | + | − | + | + | + |

[1]The UL-rating has been determined according to Underwriters Laboratory. (UL-94)
[2]Determined according to ASTM D1525,
[3]Juicing:
+ = no deposition of phosphates on the surface
− = deposition of phosphates on the surface.

It may be seen from the above results that polycarbonate/ABS mixtures have a reasonable heat distortion temperature (Vicat value). The addition of a phosphate leads to a considerable reduction thereof (compare examples A and B). The polymer mixture according to the invention (examples I, II and III) has a more [favourable] *favorable* Vicat value as compared to example B. The polymer mixture according to Example I has a reasonable flame-extinction (V-2). A considerable improvement of the flame-retarding properties (V-0) occurs by the addition of an extremely small quantity of salt (example II). This effect occurs to a far lesser extent when the same salt is used in combination with triphenyl phosphate (TPP) (example B). In order to obtain a rating V-0 it is possible to use the phosphate in combination with a bromine compound (example III).

As shown in the following examples it is possible to obtain a V-0 rating by using the oligomeric phosphate alone or in combination with a halogenated containing flame retardant.

EXAMPLES [C.D] *C, D.* IV and V

Polymer mixtures with a composition as shown in table B were prepared by compounding in an extruder. The measured properties are also recorded in table B.

TABLE B

| Example No. | IV | C | V | D |
|---|---|---|---|---|
| Composition (parts by weight) | | | | |
| PC-1 | — | — | 79 | 79 |
| PC-2 | 68 | 68 | — | — |
| ABS-2 | — | — | 9 | 9 |
| ABS-3 | 10 | 10 | — | — |
| SAN | 15 | 15 | — | — |
| Phosphate-1 | 7 | — | 12 | — |
| TPP-2 | — | 7 | — | 12 |
| Br.PC | 10 | 10 | — | — |
| Teflon | 0.3 | 0.3 | 0.2 | 0.2 |

TABLE B-continued

| Example No. | IV | C | V | D |
|---|---|---|---|---|
| Properties | | | | |
| UL94 rating at 1.6 mm(1) | V-0 | V-0 | V-0 | V-0 |
| Vicat(2) (°C.) | 114 | 108 | 98 | 92 |
| Juicing(3) | not tested | not tested | + | – |

(1), (2), (3)see notes under Table A.

As can be seen it is possible (example V) to obtain a V-0 rating with the oligomeric phosphates, at a relatively low content (12 parts by weight). In case a higher [vicat] *Vicat* temperature is required one may use a lower concentration of the oligomeric phosphate in combination with a bromine flame retardant (example IV). The oligomeric phosphate does not cause juicing at the concentrations required for obtaining a V-0 rating.

TABLE C

Examples VI–XIII and E, F
Several other polymer mixtures were prepared. Their composition and their properties are shown in Table C here below.

| Example | V | VI | VII | VIII | E | F | IX | X | XI | XII | XIII |
|---|---|---|---|---|---|---|---|---|---|---|---|
| Composition (parts by weight) | | | | | | | | | | | |
| PC-1 | 79 | 77 | 63 | — | 80 | — | — | — | — | 79 | 78 |
| PC-2 | — | — | — | 60 | — | 70 | 78 | 85 | 55 | — | — |
| ABS-2 | 9 | — | — | — | 9 | — | — | — | — | 9 | 9 |
| ABS-3 | — | 12 | 12 | 12 | — | 9 | 9 | 5 | 10 | — | — |
| SAN | — | — | 15 | 15 | — | 10 | 3 | — | 15 | — | — |
| Phosphate-1 | 12 | 11 | 10 | 13 | — | — | 10 | 10 | 10 | 12 | 13 |
| TPP-2 | — | — | — | — | 11 | 11 | — | — | — | — | — |
| Br-PC | — | — | — | — | — | — | — | — | 10 | — | — |
| Teflon | 0.2 | 0.2 | 0.2 | 0.2 | 0.2 | 0.2 | 0.2 | 0.2 | 0.5 | — | — |
| [Eigenschappen] *Properties* | | | | | | | | | | | |
| UL-94, 1.6 mm | V-0 | V-0 | V-0 | V-0 | V-0 | V-0 | V-0 | V-0 | V-0 | V-2 | V-2 |
| Total flame out time (sec) | 15 | 20 | 30 | 20 | 35 | 25 | 27 | 22 | 15 | 25 | 20 |
| Burning drips | no | no | no | no | no | no | no | no | no | yes | yes |
| Vicat (°C.) | 98 | 99 | 100 | 92 | 91 | 90 | 108 | 108 | 108 | 98 | 95 |
| Juicing | + | + | + | + | – | – | + | + | + | + | + |
| Tensile elongation at weld line (%) | 10 | 10 | 7 | 7 | 6.5 | 4 | | | | | |
| Unnotched Izod impact at weld line | 800 | 759 | 300 | 350 | 35C | 150 | | | | | |

In table C the composition and the properties of the polymer mixture according to example V have also been listed. A test piece was prepared out of the polymer mixtures according to examples V–VIII and E and F by means of injection [moulding] *molding* with a double [gate.At] *gate. At* the weld line the elongation and the unnotched Izod impact were determined. By comparing Example F (comparative example) with example VIII and by comparing example E (comparative example) with example V one can easily see that the polymer mixture according to the invention shows an improved weld line strength due to the presence of an oligomeric phosphate instead of a monophosphate.

EXAMPLES XIV–XV AND G

Three more examples were prepared, corresponding in composition with example V with the exception of the used phosphates. The used [phospates] *phosphates* and the properties are recorded in [tabel] *table* D herebelow.

TABLE D

| Example | [XVI] *XIV* | [XVII] *XV* | G |
|---|---|---|---|
| Phosphate used | phosphate-1 | phosphate-2 | TPP-1 |
| Properties | | | |
| UL-94, 1.6 mm | V-0 | HB | V-0 |
| average flame out time (sec) | 1–6 | 14–16 | 1–7 |
| Maximum single flame out time (sec) | 7 | 60 | 9 |
| Melt viscosity at 250° C. for different shear rates: | | | |
| 115 per sec. | 450 | 653 | 300 |
| 1150 per sec. | 230 | 319 | 185 |
| 2300 per sec. | 181 | 250 | 160 |
| Juicing | + | + | – |
| Vicat (°C.) | 98 | 115 | 85 |

As can be seen from the results of table D the flame retardant properties of the oligomeric phosphates decrease rapidly upon increasing the average value of n from 1.4 (phosphate-1) to 2.8 (phosphate-2). The plasticizing effect also decreases dramatically.

[We claim] *What is claimed is*:

[1. A polymer mixture which comprises an aromatic polycarbonate (A), a styrene-containing copolymer and/or styrene-containing graft copolymer (B) and a phosphate based flame-retardant (C), characterized in that the polymer mixture comprises as flame-retardant an oligomeric phosphate or a blend of oligomeric phosphates with the following formula I:

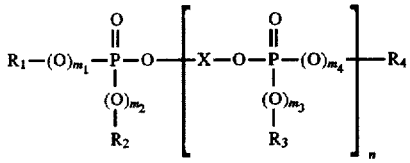

(I)

wherein $R_1$, $R_2$, $R_3$, and $R_4$, each represent an aryl or an alkaryl group chosen independently of each other with the proviso that none of $R_1$, $R_2$, $R_3$ and $R_4$ are xylyl and wherein X is an arylene group, $m_1$, $m_2$, $m_3$, and $m_4$, each independently of each other are 0 or 1 and wherein n=1,2,3,4 or 5 or wherein, in case of a blend of phosphates, n has an average value of 1 to 5.]

[2. A polymer mixture as claimed in claim 1 characterized in that the polymer mixture comprises an oligomeric phosphate of formula 1 or a blend of such phosphates wherein the (average) value of n is greater than 1 but smaller than 3.]

[3. A polymer mixture as claimed in claim 1, characterized in that the polymer mixture comprises an oligomeric phosphate of formula 1, or a blend of such phosphates wherein the (average) value of n is equal to or greater than 1, but equal to or smaller than 2.]

4. A polymer mixture [as claimed in claim 1, characterized in that the polymer comprises an oligomeric phosphate of formula 1, or a blend of such phosphates.] *which comprises an aromatic polycarbonate (A), a styrene-containing copolymer and/or styrene-containing graft copolymer (B) and a phosphate based flame-retardant (C), characterized in that the polymer mixture comprises as flame-retardant a blend of oligomeric phosphates with the following formula I:*

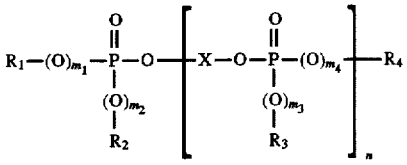

(I)

wherein $m_1$, $m_2$, $m_3$ and $m_4$ are all equal to 1, $R_1$, $R_2$, $R_3$ and $R_4$ all represent a phenyl group, X represents a phenylene group and n has an (average) value of [1.2–1.7] *1.2–1.7*.

5. A polymer mixture according to claim [1] *4*, characterized in that the mixture comprises 5–95% by weight of constituent A and 95–5% by weight of constituent B, calculated with respect to the sum of the quantities of A and B.

6. A polymer mixture according to claim [1] *4*, characterized in that the mixture comprises as constituent B a graft copolymer built up from a rubber backbone upon which have been grafted styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted [maleinimide] *maleimide* or a blend thereof.

7. A polymer mixture according to claim [1 characterised] *4 characterized* in that the mixture comprises as constituent B a copolymer of styrene, alpha-methylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted [maleinimid] *maleimide* or a blend thereof.

8. A polymer mixture according to claim [1] *4*, characterized in that the mixture comprises as constituent B a graft copolymer built up from a rubber backbone upon which have been grafted styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted [maleinimide] *maleimide* or a blend thereof and a copolymer of styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted [maleinimide] *maleimide* or a blend thereof.

9. A polymer mixture according to claim [1] *4*, characterized in that the mixture comprises 1–25 parts by weight of constituent C per 100 part by weight of A+B.

10. A polymer mixture according to claim [1] *4*, characterized in that the mixture comprises 5–20 parts by weight of constituent C per 100 parts by weight of A+B.

11. A polymer mixture as claimed in claim [1] *4*, [characterised] *characterized* in that the polymer mixture moreover comprises one or more of the following flame retardants (D):

a salt having flame-retarding properties for aromatic polycarbonates and/or a halogen-containing low-molecular weight compound and/or high-molecular weight polymer and/or a perfluoroalkane polymer and/or a metal compound active as a synergist.

12. A polymer mixture as claimed in claim [1] *4*, characterized in that the polymer mixture comprises the oligomeric phosphate (C) in combination with a salt having flame-retarding properties for aromatic polycarbonate.

13. A polymer mixture as claimed in claim [1] *4*. [characterised] *characterized* in that the polymer mixture moreover comprises a perfluoroalkane polymer.

14. Articles formed from the polymer mixture as claimed in claim [1] *4*.

*15. A polymer mixture which comprises an aromatic polycarbonate (A), a styrene-containing copolymer and/or styrene-containing graft copolymer (B) and a phosphate based flame-retardant (C), characterized in that the polymer mixture comprises as flame-retardant a blend of oligomeric phosphates with the following formula I:*

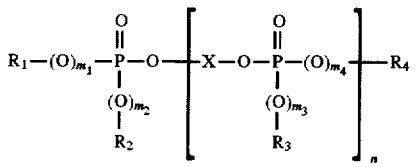

(I)

*wherein $R_1$, $R_2$, $R_3$ and $R_4$ each represent an aryl or an alkaryl group chosen independently of each other with the proviso that none of $R_1$, $R_2$, $R_3$ and $R_4$ are xylyl and wherein X is an arylene group, $m_1$, $m_2$, $m_3$ and $m_4$ each independently of each other are 0 or 1 and wherein n has an average value of 1.2–1.7.*

*16. A polymer mixture according to claim 15, characterized in that the mixture comprises 5–95% by weight of constituent A and 95–5% by weight of constituent B, calculated with respect to the sum of the quantities of A and B.*

*17. A polymer mixture according to claim 15, characterized in that the mixture comprises as constituent B a graft copolymer built up from a rubber backbone upon which have been grafted styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted maleimide or a blend thereof.*

*18. A polymer mixture according to claim 15 characterized in that the mixture comprises as constituent B a copolymer of styrene, alpha-methylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted maleimide or a blend thereof.*

*19. A polymer mixture according to claim 15, characterized in that the mixture comprises as constituent B a graft copolymer built up from a rubber backbone upon which have been grafted styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted maleimide or a blend thereof and a copolymer of styrene, alphamethylstyrene, a styrene substituted with one or more halogen atoms or with organic groups in its aromatic nucleus, methylmethacrylate or a blend thereof and acrylonitrile, methacrylonitrile, methylmethacrylate, maleic anhydride, N-substituted maleimide or a blend thereof.*

*20. A polymer mixture according to claim 15, characterized in that the mixture comprises 1–25 parts by weight of constituent C per 100 part by weight of A+B.*

*21. A polymer mixture according to claim 15, characterized in that the mixture comprises 5–20 parts by weight of constituent C per 100 parts by weight of A+B.*

*22. A polymer mixture as claimed in claim 15, characterized in that the polymer mixture moreover comprises one or more of the following flame retardants (D):*

- *a salt having flame-retarding properties for aromatic polycarbonates and/or*
- *a halogen-containing low-molecular weight compound and/or high-molecular weight polymer and/or*
- *a perfluoroalkane polymer and/or*
- *a metal compound active as a synergist.*

*23. A polymer mixture as claimed in claim 15, characterized in that the polymer mixture comprises the oligomeric phosphate (C) in combination with a salt having flame-retarding properties for aromatic polycarbonate.*

*24. A polymer mixture as claimed in claim 15, characterized in that the polymer mixture moreover comprises a perfluoroalkane polymer.*

*25. Articles formed from the polymer mixture as claimed in claim 15.*

* * * * *